US008428236B2

(12) United States Patent
Smaak et al.

(10) Patent No.: US 8,428,236 B2

(45) Date of Patent: Apr. 23, 2013

(54) CONFERENCE AUDIO SYSTEM, PROCESS FOR DISTRIBUTING AUDIO SIGNALS AND COMPUTER PROGRAM

(75) Inventors: Marc Smaak, Bergen op Zoom (NL); Henk Goudsmits, Best (NL); Chen Tchang, Bavel (NL)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 12/738,696

(22) PCT Filed: Jun. 11, 2008

(86) PCT No.: PCT/EP2008/057287

§ 371 (c)(1), (2), (4) Date: Apr. 19, 2010

(87) PCT Pub. No.: WO2009/149754

PCT Pub. Date: Dec. 17, 2009

(65) Prior Publication Data

US 2010/0215165 A1 Aug. 26, 2010

(51) Int. Cl.
*H04M 3/42* (2006.01)

(52) U.S. Cl.
USPC .............. 379/202.01; 379/203.1; 379/204.01; 379/205.01; 370/260

(58) Field of Classification Search ..................... 379/202.01–207.03; 455/416; 709/204; 348/14.08–14.09
See application file for complete search history.

(56) References Cited

U.S. PATENT DOCUMENTS 3,992,586 A 11/1976 Jaffe

FOREIGN PATENT DOCUMENTS

| | | |
|---|---|---|
| EP | 1 686 835 | 8/2006 |
| JP | 4-312098 | 11/1992 |
| JP | 2001-112083 | 4/2001 |
| JP | 2005-80110 | 3/2005 |

*Primary Examiner* — Joseph J Nguyen

(74) *Attorney, Agent, or Firm* — Michael J. Striker

(57) ABSTRACT

Conference audio systems are widely known and are usually used in political or economic debates, at fairs and wherever a plurality of people discuss with each other supported by a microphone-amplifier-loudspeaker system. In known systems each delegate of a conference has a seat with a working table in which the microphone and the loudspeaker is integrated. A conference audio system is proposed comprising a plurality of delegate units (2), each delegate unit (2) having a delegate loud-speaker (5) and/or a delegate microphone (4), a control means (3, 15) for distributing at least one audio signal from at least one of the delegate microphones (4) or another sound source to a plurality of the delegate loudspeakers (5), the plurality of delegate loud-speakers (5) generating a common audio atmosphere, delay means (16) operable to add a time delay on the audio signal, whereby the time delay is dependent from the distance between the position of the delegate microphone (4) or sound source, respectively, generating the audio signal and the individual delegate loudspeaker (5) position.

13 Claims, 2 Drawing Sheets

CONFERENCE AUDIO SYSTEM, PROCESS FOR DISTRIBUTING AUDIO SIGNALS AND COMPUTER PROGRAM

CROSS-REFERENCE

The invention described and claimed hereinbelow is also described in PCT/EP2008/057287, filed on Jun. 11, 2008. This application, whose subject matter is incorporated here by reference, provides the basis for a claim of priority of invention under 35 U.S.C. 119(a)-(d).

BACKGROUND OF THE INVENTION

The invention relates to a conference audio system comprising a plurality of delegate units, each delegate unit having a delegate loudspeaker and/or a delegate microphone.

More specifically, the invention relates to such a conference audio system further comprising a control means for distributing audio signals from at least one of the delegate microphones or another sound source to a plurality of the delegate loudspeakers, the plurality of delegate loudspeakers generating a common audio atmosphere, and delay means operable to add a time delay on the audio signals. Furthermore, the invention relates to a process for distributing audio signals in a conference audio system and a respective computer program.

PRIOR ART

Conference audio systems are widely known and are usually used in political or economic debates, at fairs and wherever people discuss with each other supported by a microphone-amplifier-loudspeaker system. In known systems each delegate of a conference has a seat with a working table in which the microphone and the loudspeaker is integrated.

The document EP 1 686 835 A1, probably representing the closest prior art, describes a conference audio system with a plurality of delegate units, whereby each delegate unit comprises at least a microphone and a loudspeaker. The delegate units are connected with a signal-bus, allowing the exchange of audio and further signals between the delegate units.

SUMMARY OF THE INVENTION

According to the invention a conference audio system with the features of claim 1, a process for distributing audio signals with the features of claim 10 and a computer program with the features of claim 12 are proposed. Preferred or advantageous embodiments of the invention are disclosed by the dependent claims, the description and the figures as attached.

The conference audio system according to the invention comprises a plurality of delegate units, for example more than 20, 50 or 100 delegate units, each delegate unit having a delegate loudspeaker and/or a delegate microphone. A conference may be defined as each situation in which people meet and use a microphone-amplifier-loudspeaker system. The delegates may be defined as the people attending the meeting. The invention is especially not restricted to the situation of political debates or discussions, the invention may also be used for example in musical or cultural events.

Preferably all or some of the delegate units are realized as speaker-listener units, each comprising a loudspeaker and a microphone. Additionally or alternatively, each or some of the delegate units comprise either a loudspeaker or a microphone.

In order to interconnect the plurality of delegate units with each other a control means, for example a control unit, for distributing at least one audio signal from at least one of the delegate microphones or another sound source to a plurality of the delegate loudspeakers is provided, whereby the delegate loudspeakers generate a common audio atmosphere. The sound source may be a live sound source like a music keyboard and/or a storage device like an audio recorder. The control means may be realized as a data processing unit, as an analog system or—in the simplest form—as a hardwiring of cables. The plurality of delegate units may be connected by wiring or wireless, analog, digital or by a network, optionally including the Internet.

According to the invention, the time delay is dependent on the distance between the position of the delegate microphone or the sound source generating the audio signal and the delegate loudspeaker position emitting the audio signal. The time delay is added in order to provide directivity or directional properties to the sound atmosphere generated under participation of the emitted audio signal.

It is one observation of the invention that normally and in the case of known conference audio systems, all delegate loudspeakers reproduce an audio signal of the active speaker or speakers simultaneously. In a small room it appears to be still possible to localize the person currently speaking, because there is—besides the audio signals emitted by the delegate loudspeakers—also a direct acoustical path from the speaker's mouth to the listener. In a larger room, however, the listener can be further away from the speaker. In this case it can be nearly impossible to localize the position of the speaker and thus any directivity of the audio atmosphere is lost.

According to the invention it is proposed to add a time delay to each individual delegate loudspeaker, the delay time being individually dependent on the distance between the active delegate loudspeaker being supported by the audio signal from the active delegate microphone. The time delay is preferably in accordance with the "Haas effect". The Haas effect is also called the precedence effect and describes the human psychoacoustic phenomena of correctly identifying the direction of the sound source heard in both ears but arriving at different times. Due to the head's geometry (two ears spaced apart, separated by a barrier) the direct sound from any source first enters the ear closest to the source, then the ear farthest away. The Haas effect describes that humans localize a sound source based upon the first arriving sound, if the subsequent arrives within 25 to 35 milliseconds delay. If the later arrivals are longer than this time delay, then two distinct sounds are heard.

An advantage of the present invention is that the directivity added to the audio atmosphere is realized by using the preferably built-in delegate loudspeakers of the delegate units. Hence, the further the listener is away from the active speaker, the larger the delay time added to the audio signal coming from his/her loudspeaker will be. Therefore one possible advantage of the conference audio system according to the invention is that directivity is added to the audio signal by the system with only a low effort concerning necessary additional technical equipment compared to a conference audio system without a directional sound capability.

In a preferred embodiment of the invention the delay means is operable to provide neighboring delegate units and/or delegate units placed adjacent to each other with different time delays, each individual time delay being dependent from the distance between the individual delegate unit and the active microphone and/or sound source position. The directivity to the audio signal or to the sound atmosphere is then given by the timing difference in the audio signal from the listener's delegate loudspeaker and the delegate loudspeakers from the direct neighboring delegate units. Preferably the timing difference is smaller than 30 milliseconds. Because the Haas effect still works even if the earlier sound is up to 10 dB lower than the sound level of the listeners own loudspeaker, the neighboring delegate units are less than 6 m, preferably less than 3 m away and/or the difference of level of the sound signal emitted by the listeners delegate loudspeaker and the level of the sound signal emitted by a neighboring delegate loudspeaker both measured at the position of the listener is less than about 10 dB.

In a preferred realization of the invention the delegate unit or delegate units is/are embodied as a one-person working place. For example the delegate unit is realized as a table or seat with a built-in delegate loudspeaker and/or delegate microphone.

In a possible preferred embodiment the delay means is implemented and/or integrated in the control means, especially in the control unit, and supplies audio signals with individual time delays for each delegate loudspeaker being activated, whereby the individually time-delayed audio signals are distributed by the control means. In this embodiment the control means is provided with position information about the active delegate microphone or another active sound source and the positions of the active delegate loudspeakers emitting the audio signal in order to be able to estimate the individual time delays. As a result each delegate loudspeaker receives the audio signal with an individual time delay, being different to the time delays of the neighboring or adjacent delegate loudspeakers.

Additionally or alternatively, the control means is provided with information about the distance between the active delegate microphone or the active sound source and the active delegate loudspeakers in order to generate the individual time delays. In this version of the invention only the absolute distance between the active delegate microphone/sound source and the active delegate loudspeakers is evaluated.

In another possible preferred embodiment of the invention the delay means is implemented and/or integrated in each delegate unit, whereby the time delay is locally added to the distributed audio signals. In this case the same audio signal is distributed to the individual delegate units, whereby the individual time delay is added at the delegate units after distributing the audio signal. In this embodiment the delay means is realized as a delay module in each delegate unit having a delegate loudspeaker. The embodiment with the distributed delay modules shows the advantage, that the technical effort for the wiring of the delegate units is low, as the audio signals may be transferred in a serial manner to each delegate unit. In still another embodiment of the invention the individual time delays are added somewhere between the control means and the delegate units.

In order to provide the delay means with the information about the active microphone and/or sound source position, identification means are provided which encode each audio signal with an identification stamp and/or signal, which enables to identify the delegate microphone or sound source, respectively, identity and/or position. This stamp allows that the delay means can estimate the origin of a present audio signal.

In one possible embodiment the identification means is implemented in each delegate unit with a delegate microphone and/or with another sound source, so that the audio signals are encoded at the location, where the audio signals are generated. This embodiment has the advantage, that the delegate units can be wired or connected in a serial order and/or regardless of their physical position because the necessary information for identifying the position or location of the active delegate microphone and/or another sound source is encoded in the audio signal.

In another possible embodiment the identification means is implemented and/or integrated in the control means, especially in the control unit. In this embodiment it is preferred, that for each delegate microphone and/or another sound source a separate channel is provided to the control means, whereby the identification stamp and/or signal is encoded dependent on the active channel.

With the advantage, that real-time requirements and/or Internet transfer are simplified it is preferred that the or another identification means is operable to encode each audio signal with a time stamp and/or signal, which enables to identify time positions of the audio signals, for example the start and the stop the audio signal. With this additional information not only a relative time delay can be provided for the audio signals but also an absolute time delay can be generated. With this additional feature it is also possible to provide the audio signals time-lagged but with directivity.

Another subject matter of the invention concerns the process for distributing audio signals in a conference audio system, preferably as described before and/or according to one of the preceding claims, with the features of claim 10.

According to the process a time delay is added to an audio signal generated by a delegate microphone and/or another sound source, whereby the audio signal is distributed to a plurality of delegate loudspeakers and whereby the time delay is added in dependence of the individual position and/or distance between each of the delegate loudspeakers and the position of the delegate microphone and/or another sound source.

In a preferred embodiment of the invention it is proposed that in case more than one delegate microphone and/or sound source are active at the same time but with different positions, thereby generating different audio signals, different time delays are added to the audio signals delivered to one single delegate loudspeaker. The underlying idea of this embodiment is that the directional characteristics for each audio signal is configured, so that the delegate microphones and/or sound sources with different positions are sensed by the delegate at the single delegate loudspeaker as they have different locations.

A further subject matter of the invention is a computer program with the features of claim 12.

BRIEF DESCRIPTION OF THE FIGURES

Further features, effects and advantages of the invention are disclosed by the following description of a preferred embodiment of the invention and the figures as attached. The figures show.

DETAILED DESCRIPTION OF THE PREFERRED EMBODIMENTS

In the figures similar or like parts are denoted with similar or like reference numbers.

Figure 1:
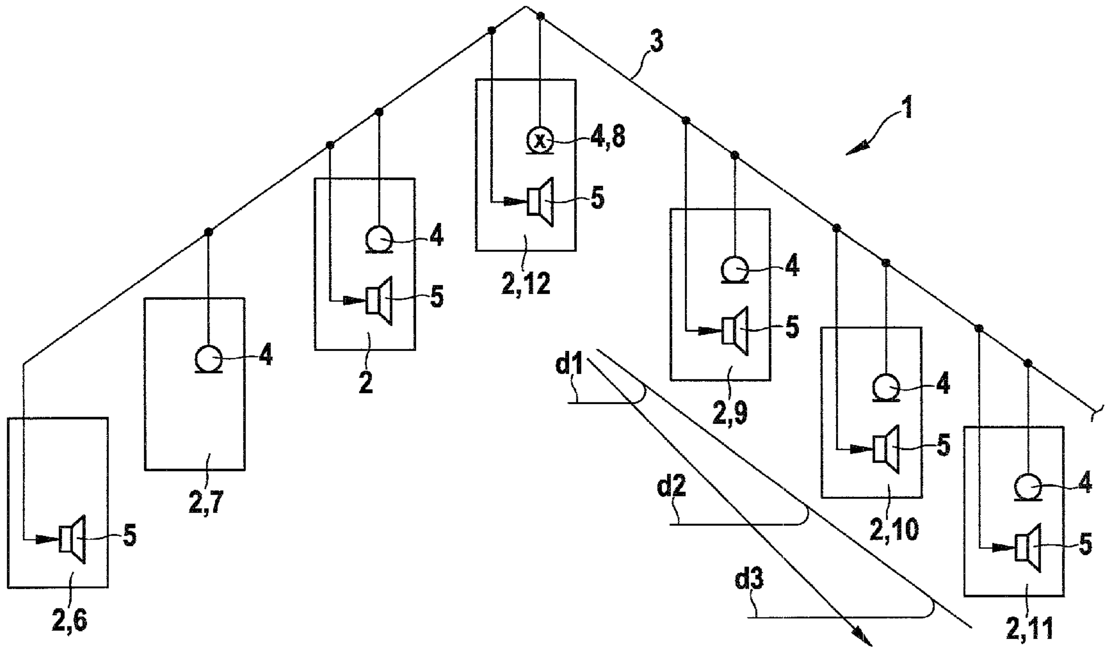
FIG. 1 a schematic view of a congress audio system as a first embodiment of the invention.

FIG. 1 shows a schematic view of a congress audio system 1 allowing a directional sound function based upon distributed loudspeakers. The congress audio system 1 comprises a plurality of delegate units 2, which are interconnected by a control means embodied as connection means 3. Most of the delegate units 2 comprise a delegate microphone 4 and a delegate loudspeaker 5. Some of the delegate units may only be realized as listener units 6 having only a delegate loudspeaker 5 or as speaker units 7 having only a delegate microphone 4.

The delegate units 2 are integrated in a one-person workplace, for example realized as a lectern, a desktop or a seat for example in a congress hall, auditorium, lecture hall, courtroom or the like. The delegate units 2 are for example arranged in rows and columns or in concentric circles.

In order to realize the directional sound function, the audio signal generated by an active delegate microphone 8 of a specific delegate unit 12 is provided with a time delay in dependence on the distance between the specific delegate unit 12 and the delegate unit 2 with the delegate loudspeaker 5 emitting the audio signal to the listeners. The time delay is in accordance with the acoustic velocity (sound-propagation velocity). As a listener does not only hear his own delegate loudspeaker 5, but also the emitted audio signals of neighboring and/or adjacent delegate loudspeakers 5, which are provided with a different time delay in dependence on their respective distance to the specific delegate unit 12 generating the audio signal, the sound atmosphere of the listener imitates a directional sound resulting from the specific delegate unit 12. As explained before, the human psychoacoustic phenomena of correctly identifying the direction of a sound source heard by both ears but arriving at different times is based on the Haas effect, also called the precedence effect.

Returning to the schematic view of FIG. 1 and assuming that delegate microphone 8 is set as the active delegate microphone and the delegate units 9, 10 and 11 are adjacent to each other but arranged in a ascending distance to the delegate unit 12 or the active delegate microphone 8, a first time delay d1 is added to the audio signal to be emitted by the delegate loudspeaker 5 of the delegate unit 9, a second time delay d2, which is longer than the first delay d1, is added to the audio signal to be emitted by the delegate loudspeaker 5 of the delegate unit 10 and a third time delay d3 is added to the audio signal emitted by the delegate loudspeaker 5 of the delegate unit 11, which is longer than the time delay d2 and the time delay d1. As the listener of the delegate unit 10 also hears the emitted audio signals of the adjacent delegate units 9 and 11 and maybe further delegate units (not shown) he can identify a direction of a virtual sound source, whereby the direction of the virtual sound source is identical to the direction to the active microphone 8.

It shall be underlined that the audio atmosphere of the listener at the delegate unit 10 is generated under participation of the delegate loudspeakers 5 of the delegate units 9, 10 etc. next to the delegate unit 10. Although the sound from the adjacent delegate units 9 and 11 is significantly lower than the sound emitting from the delegate unit 10 it is still possible to recognize the direction of the virtual sound source, respectively the active microphone 8, as the Haas effect is also true even in case the volume of the audio signals arriving at both ears of the listeners is different.

Figure 2:
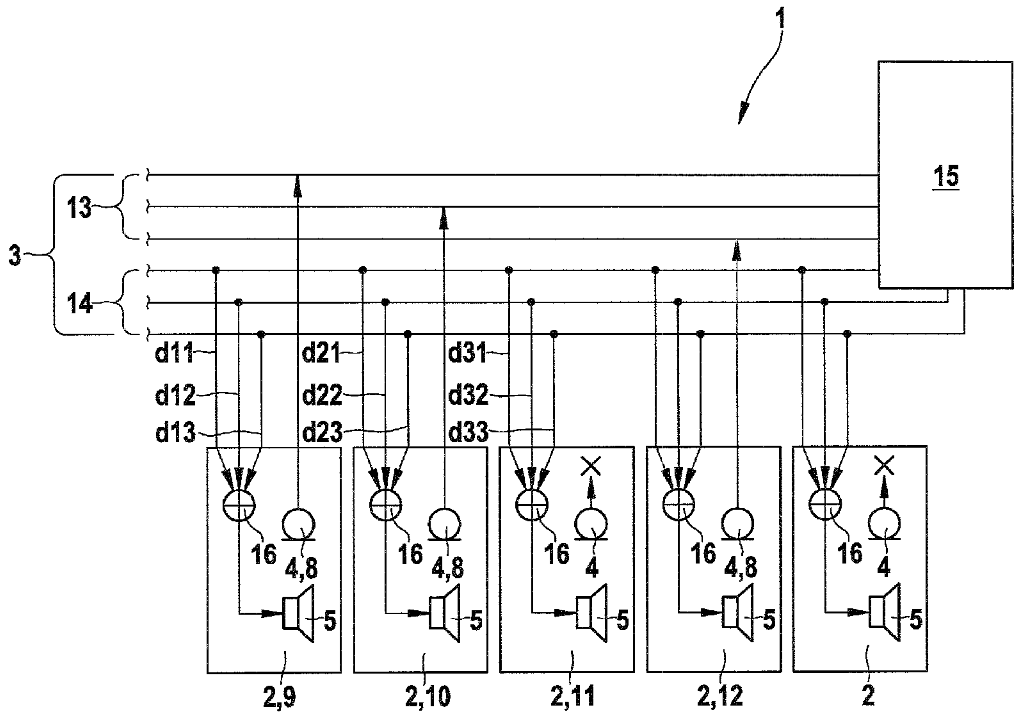
FIG. 2 a block diagram of a first possible realization of the congress audio system in FIG. 1.

FIG. 2 shows a first possible embodiment of the congress audio system 1 comprising a plurality of the delegate units 2.

In this embodiment the connection means 3 is realized as a plurality of parallel channels, for example wires, whereby each delegate microphone 4 is connected to an individual microphone channel 13 and each delegate loudspeaker 5 is connected to a plurality of loudspeaker channels 14. All microphone channels 13 and all loudspeaker channels 14 are connected with a control unit 15, which allows a central audio processing for example in view of volume and tone control, equalizing, acoustical feedback, suppression and/or scrambling to hide the identity of the speaker (for example used in courtrooms) etc.

In case and as it is shown in FIG. 2 more than one delegate microphone 8 is active, for each active delegate microphone 8 one of the microphone channels 13 is used to transport the audio signals to the control unit 15. The same number of the loudspeaker channels 14 is used to transfer the audio signals from the control unit 15 to the delegate units 2. Each delegate unit 2 is connected to each of the active loudspeaker channels 14 in order to receive the audio signals resulting from the active delegate microphones 8. The delegate unit 2 comprises a delay unit 16, which is operable and/or adapted to add an individual time delay to each of the audio signals. The individual time delay is dependent on the distance between the respective delegate unit 2 and the active microphone 8 of the respective audio signal. So in this case three different time delays d21, d22, and d23 are added to the delegate unit 10. Accordingly, individual time delays d11, d12, d13 and d31, d32, d33 are added to the delegate units 9 and 11, respectively. The length of the time delays d11 to d33 is estimated by the delay unit 16, for example on basis of an encoded position stamp in the audio signals, on basis of the selection of the loudspeaker channel 14, etc. In another embodiment the microphone channels 13 and the loudspeaker channels 14 are realized as an audio data stream channel, whereby the audio signals are digital or analog represented.

The invention claimed is:

1. A conference audio system (1), comprising:

a plurality of delegate units (2), each delegate unit (2) having a delegate loudspeaker (5), a delegate microphone (4), or both;

a control means (15) for distributing at least one audio signal from at least one of the delegate microphones (4) or another sound source to a plurality of the delegate loudspeakers (5), the plurality of delegate loudspeakers (5) generating a common audio atmosphere;

delay means (16) operable to add a time delay on the audio signal, wherein the time delay is dependent from the distance between the position of the delegate microphone (4) or sound source, respectively, generating the audio signal and the individual delegate loudspeaker (5) position, wherein the time delay is added in such a way to provide directivity or directional properties to the common audio atmosphere generated under participation of the generated audio signal, and wherein a length of the time delays is estimated based on an encoded position stamp in the audio signal or based on a selection of a loudspeaker channel.

2. The conference audio system (1) according to claim 1, wherein the delay means (16) is operable to provide neighboring delegate units (9, 10, 11), delegate units (9, 10, 11), or both placed adjacent to each other with different time delays.

3. The conference audio system (1) according to claim 1, wherein the delegate unit (2) is embodied as a one-person working place.

4. The conference audio system (1) according to claim 1, wherein the distance between the delegate units (2) is less than 6 m, the loudness or volume difference of adjacent delegate loudspeaker (5) is less than 10 dB at the listeners position, or both.

5. The conference audio system (1) according to claim 1, wherein the delay means is implemented, integrated, or both implemented and integrated in the control means (15) and provides audio signals with individual time delays for each delegate loudspeaker (5), whereby the time delayed audio signals are distributed by the control means (15).

6. The conference audio system (1) according to claim 1, wherein the delay means (16) is implemented, integrated, or both implemented and integrated in each delegate unit (2), whereby the time delay is locally added to the distributed audio signals.

7. The conference audio system (1) according to claim 1, further comprising identification means operable to encode each audio signal with an identification stamp, signal, or both, which enables to identify the delegate microphone (4) identity, position, or both identity and position.

8. The conference audio system (1) according to claim 1, wherein the identification means are implemented and/or integrated in each delegate unit (2), in the control means (15), or in each delegate unit (2) and in the control means (15).

9. The conference audio system (1) according to claim 1, wherein the or an identification means is operable to encode each audio signal with a time stamp, which enables to identify a feature selected from the group consisting of the start, stop, and length of the audio signal.

10. Delay means (16) operable to add a time delay on an audio signal, whereby the delay means (16) is implemented or integrated in a control means (15) or a delegate unit (2) of a conference audio system (1) of a conference audio system (1) according to claim 1, whereby the time delay is dependent from the distance between a position of a delegate microphone (4) or a sound source, respectively, generating the audio signal and an individual delegate loudspeaker (5) position of a plurality of delegate loudspeakers (5), wherein the time delay is added in such a way to provide directivity or directional properties to the common audio atmosphere generated under participation of the generated audio signal, and wherein a length of the time delays is estimated based on an encoded position stamp in the audio signal or based on a selection of a loudspeaker channel.

11. A process for distributing audio signals in a conference audio (1) system according to claim 1, whereby an audio signal is generated by a delegate microphone (4), another sound source, or both, whereby the audio signal is distributed to a plurality of delegate loudspeakers, whereby a time delay is added to the audio signal, and whereby the length of the time delay is in dependence of the individual position, distance, or both position and distance between each of the delegate loudspeakers (5) and the position of the delegate microphone (4), the another sound source, or both, wherein the time delay is added in such a way to provide directivity or directional properties to the common audio atmosphere generated under participation of the generated audio signal, and wherein a length of the time delays is estimated based on an encoded position stamp in the audio signal or based on a selection of a loudspeaker channel.

12. The process according to claim 11, wherein in case a plurality of delegate microphones (4), sound source, or both delegate microphones (4) and sound source with different positions generate audio signals, different time delays are added to the audio signals supplying one single delegate loudspeaker (5).

13. A non-transitory computer readable medium containing a computer program comprising program-code means enabling to carry out the process according to claim 11, when the computer program is carried out on a computer, a conference audio system (1), or both.

* * * * *